US008538739B2

(12) United States Patent
Woodbury

(10) Patent No.: US 8,538,739 B2
(45) Date of Patent: Sep. 17, 2013

(54) ADJUSTING MODEL OUTPUT EVENTS IN A SIMULATION

(75) Inventor: James Edward Woodbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 11/930,396

(22) Filed: Oct. 31, 2007

(65) Prior Publication Data

US 2009/0112560 A1 Apr. 30, 2009

(51) Int. Cl.
*G06G 7/62* (2006.01)
*G09B 9/00* (2006.01)
*G09B 9/02* (2006.01)

(52) U.S. Cl.
USPC .................................. 703/17; 434/28; 434/29

(58) Field of Classification Search
USPC .................................. 703/17; 434/11, 19, 29
See application file for complete search history.

(56) References Cited

U.S. PATENT DOCUMENTS

2005/0289092 A1* 12/2005 Sumner et al. .................. 706/46
2006/0277016 A1* 12/2006 Kouchi et al. .................. 703/11
2006/0292535 A1* 12/2006 O'Connor et al. ............ 434/262

OTHER PUBLICATIONS

Wizards of the Coast, "The Basics", 2003, 3 pages. Available at http://www.wizards.com/default.asp?x=d20/article/srd35.*
Wizards of the Coast, "Legal Information", 2003, 2 pages. Available at http://www.wizards.com/default.asp?x=d20/article/srd35.*
Chadwell, Dustin. "Dungeons and Dragons Online: Stormreach Review (PC)", Oct. 10, 2006, 5 pages. Available at http://www.gaming-age.com/cgi-bin/reviews/review.pl?sys=pc%game=ddo.*
Metter et al. Chapter 20, Accidents in Radiation Therapy, Medical Management of Radiation Accidents, Second Edition. 2001, 2 pages.*
http://spaceflightnow.com/news/n0410/14sts114sim, "NASA begins rehearsals for next space shuttle mission'", pp. 1-2, printed Jan. 10, 2007.
http://en.wikipedia.org/wiki/Flight_simulator, "Flight Simulator", pp. 1-6, printed Jan. 10, 2007.

* cited by examiner

*Primary Examiner* — Suzanne Lo
(74) *Attorney, Agent, or Firm* — Owen J. Gamon

(57) ABSTRACT

In an embodiment, input data is received from a user and reference data is calculated based on an original simulation state. An adjustment amount is determined based on the difference between the input data and the reference data. An event value is generated via a probability function, and the event value is adjusted by the adjustment amount into an adjusted event value. A next simulation state is then determined based on the adjusted event value, and the next simulation state is presented to a user. In an embodiment, the adjustment amount is proportional to the difference. In this way, direct and realistic feedback to the user is provided via the simulation state, which positively reinforces correct behavior and negatively reinforces incorrect behavior, more so than does an unadjusted simulation.

10 Claims, 8 Drawing Sheets

| TRAINING REFERENCES | 160 |
| --- | --- |

| REFERENCE SIMULATION STATE (620) | REFERENCE DATA (625) | |
| --- | --- | --- |
| TAKEOFF POSITION; KTAS = 0; WIND = 10 NE | CARB HEAT = 0, FLAPS = 50, THROTTLE = 100 | 605 |
| LANDING POSITION; ANGLE OF ATTACK = +5; KTAS = 85; WIND = 8 SW | CARB HEAT = 100; FLAPS = 100; THROTTLE = 55; STICK POSITION = 45, 65; RUDDER = 15 | 610 |
| LANDING POSITION; ANGLE OF ATTACK = +10; KTAS = 88; WIND = 12 SW | CARB HEAT = 100; FLAPS = 100; THROTTLE = 52; STICK POSITION = 41, 69; RUDDER = 18 | 615 |

ADJUSTING MODEL OUTPUT EVENTS IN A SIMULATION

FIELD

An embodiment of the invention generally relates to adjusting model output events used in a simulation.

BACKGROUND

Computer systems typically include a combination of hardware (e.g., semiconductors, circuit boards, etc.) and software (e.g., computer programs). One use of computer systems is for simulations of real-world activity. An important class of simulation is that used for training. Users often train for real-world activity using simulators because using the simulation is less expensive, more efficient, or less dangerous than training using the actual real-world activity.

An important design objective of current simulations is often realism, meaning that the simulation portrays, reflects, implements, or simulates actual real-world activity or events as closely as possible. But, in a training situation, complete simulation realism can actually result in ambiguous or undesirable positive and negative feedback for the user trainee. This is true, for example, when the user makes an "incorrect" decision (i.e., an error), but the parameters of the simulation (especially random/probabilistic effects or effects not under the user's direct control) allow the outcome that the user experiences to be positive, in spite of the user's error. To understand this phenomenon, consider the example of a flight simulator designed to train user pilots to land an airplane. One of the actions on a landing checklist, which the user trainee is to follow, could be the application of carburetor heat, as a precautionary measure to prevent the possible formation of ice in the carburetor, which could result in loss of engine power. But, the formation of ice in a carburetor does not always occur in the absence of carburetor heat, depending on a variety of factors, such as the ambient temperature, the relative humidity, and the velocity of air and fuel through the carburetor. Thus, a flight simulator that simulates the probability of the occurrence of real world events in a completely realistic manner will simulate a loss of engine power only occasionally, in response to the user error of failing to follow the landing checklist. Thus, a simulation that simulates the probability of real-world events in a completely realistic manner is not necessarily the best tool for learning because in a completely realistic simulation, sometimes users make mistakes and suffer no adverse consequences. Conversely, sometimes adverse events occur that are beyond the control of the user. For example, a pilot may encounter adverse weather conditions that were unforeseeable and unavoidable. But, an inexperienced user (who is precisely the type of user who is likely to be training using the simulator) may experience difficulty in distinguishing between negative feedback that was preventable and negative feedback that was unavoidable, which may cause confusion and lack of confidence.

Current simulators have attempted to address the aforementioned problems via the following techniques. As a first technique, some simulators give warning messages in response to user errors or information messages when unpreventable negative feedback occurs. For example, a simulator might display a warning error message of the type: "You forgot to apply carburetor heat" or an informational message of the type "A wind shear event occurred, but there was nothing you could have done to prevent it." While such techniques do provide the user with negative feedback or reassurance in real-time, the realism of the simulation is distorted in that the warning or informational message is artificial, meaning that such a warning or message would not occur if the user were actually flying the airplane. Further, the user does not experience the potential adverse effects of the error, such as the simulated loss of engine power, which would be more memorable than the mere warning message. Also, the user may become dependent upon the artificial warning or message, and when confronted with the real-world event, the absence of a warning message might be interpreted as confirmation that all is well (when, in fact, all is not well), and the absence of the reassuring information message might be interpreted as an indication that the negative feedback was avoidable (when, in fact, the negative feedback was unavoidable).

As a second technique, some simulators are designed with the assumption that the training repetitions will be sufficient, so that the negative outcome (e.g., the simulated loss of engine power) will occur often enough to provide useful (for training purposes) negative feedback. The problems with relying on training repetitions are 1) the negative outcome might be sufficiently rare so to be negligible, even with a large number of training repetitions, and 2) the probability of a negative outcome might be close to the probability of a positive outcome, so that the difference between making an error and performing correctly is nearly imperceptible to the user.

As a third technique, some simulators rely on an after-the-fact debriefing or feedback by a human instructor to point out errors made by the user or provide reassurance to the user. Unfortunately, the positive feedback that the user receives (landing the plane successfully despite the error of failing to apply carburetor heat) still occurs in real-time, and this positive feedback may be too influential in reinforcing the incorrect behavior/decision. Also, a human instructor might not be available for every simulation or might not notice every error or unpreventable negative feedback, the likelihood of which increases if the instructor is distracted by supervising multiple user trainees.

Thus, without a better way to simulate real-world events, users will not receive the full benefit of learning from training simulators.

SUMMARY

A method, apparatus, system, and storage medium are provided. In an embodiment, input data is received from a user and reference data is calculated based on an original simulation state. An adjustment amount is determined based on the difference between the input data and the reference data. An event value is generated via a probability function, and the event value is adjusted by the adjustment amount into an adjusted event value. A next simulation state is then determined based on the adjusted event value, and the next simulation state is presented to a user. In an embodiment, the adjustment amount is proportional to the difference. In this way, direct and realistic feedback to the user is provided via the simulation state, which positively reinforces correct behavior and negatively reinforces incorrect behavior, more so than does an unadjusted simulation. In an embodiment, the realism of the simulation is maintained, no debriefing or after-the-fact analysis is required, and the training value of the simulation need not depend on repetition.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

In an embodiment, input data is received from a user and reference data is calculated based on an original simulation state. An adjustment amount is determined based on the difference between the input data and the reference data. An event value is generated via a probability function, and the event value is adjusted by the adjustment amount into an adjusted event value. A next simulation state is then determined based on the adjusted event value and the next simulation state is presented to a user. In an embodiment, the event value is adjusted in a positive direction when the difference is less than a threshold amount from the reference data, and the next simulation state based on the adjusted event value provides positive feedback for the input data. In an embodiment, the event value is adjusted in a negative direction when the difference is more than a threshold amount from the reference data, and the next simulation state based on the adjusted event value provides negative feedback for the input data.

Figure 1:
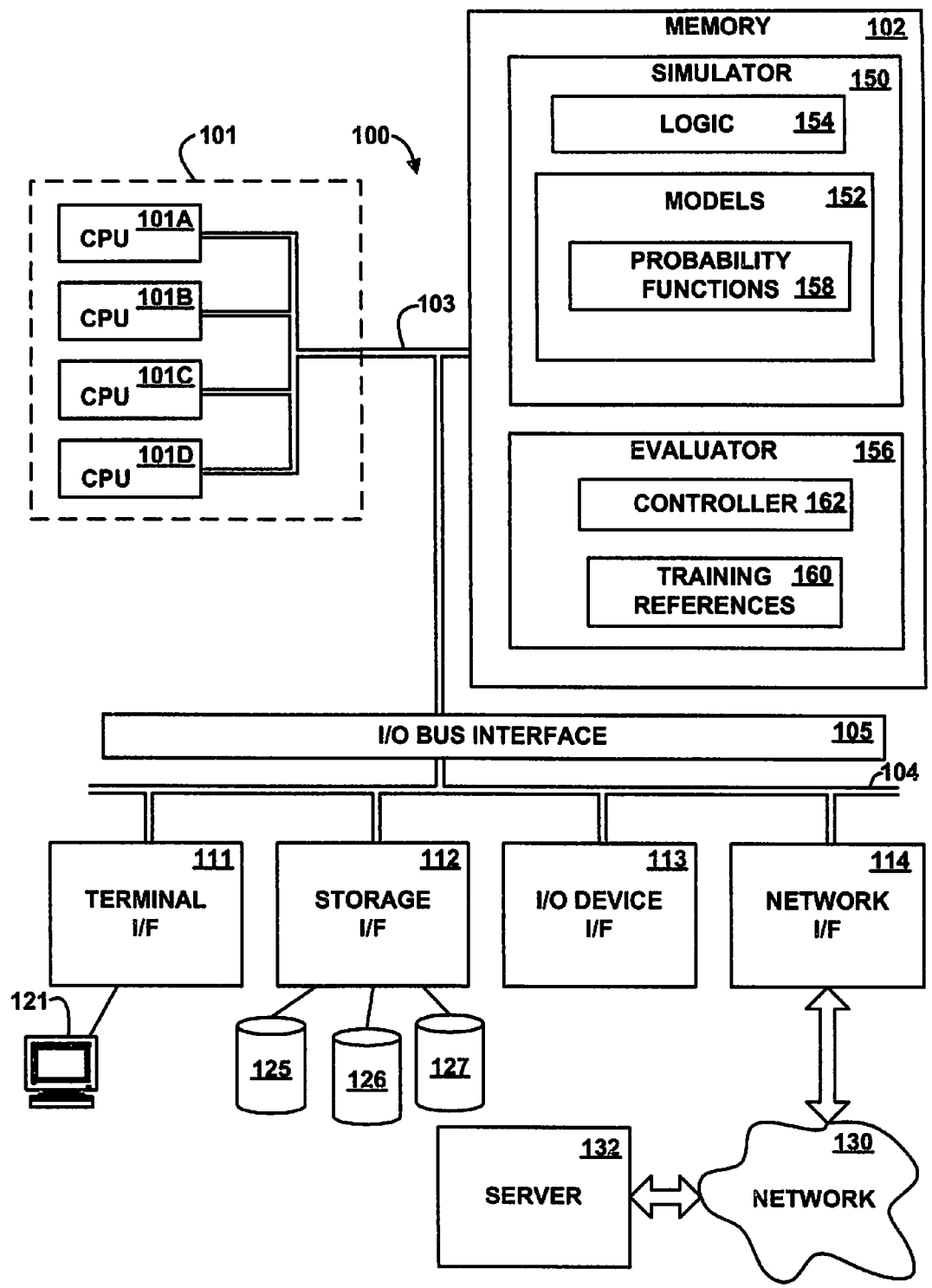
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a server computer system 132 via a network 130, according to an embodiment of the present invention. The term "server" is used herein for convenience only, and in various embodiments a computer system that operates as a client in one environment may operate as a server in another environment, and vice versa. In an embodiment, the hardware components of the computer systems 100 and 132 may be implemented by IBM System i5 computer systems available from International Business Machines Corporation of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a simulator 150 and an evaluator 156. Although the simulator 150 and the evaluator 156 are illustrated as being contained within the memory 102 in the computer system 100, in other embodiments some or both of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the simulator 150 and the evaluator 156 are illustrated as being contained within the main memory 102, these elements are not necessarily all completely contained in the same storage device at the same time. Further, although the simulator 150 and the evaluator 156 are illustrated as being separate entities, in other embodiments some of them, portions of some of them, or all of them may be packaged together.

The simulator 150 includes models 152 and logic 154. The models 152 govern or influence some part of the simulator's behavior and produce model output in the form of events. More particularly, the model 152 influences the behavior of the simulator 150 in a manner that effects the results of the simulation (the current simulation state) as perceived by the user. The models 152 have behavior that is based on probabilistic or random factors, such as the included probability functions 158.

In various embodiments, the probability functions 158 may be implemented as discrete probability functions or continuous probability functions. A discrete probability function, p(x), is a function that satisfies the following probability axioms:

1. The probability that an event variable x can take a specific data value is p(x). That is:

$$P[X=x]=p(x)=p_x;$$

2. p(x) is non-negative for all real x; and
3. The sum of p(x) over all possible values of x is 1, that is:

$$\sum_j p_j = 1$$

where j represents all possible values that the event variable x can have and $p_j$ is the probability at $x_j$.

One consequence of the above axioms is that $0<=p(x)<=1$.

A continuous probability function, f(x), is a function that satisfies the following probability axioms:

1. The probability that x is between two points a and b is $$p[a \leq x \leq b] = \int_a^b f(x)dx$$

2. It is non-negative for all real x; and
3. The integral of the probability function is one, that is $$\int_{-\infty}^{\infty} f(x)dx = 1.$$

Since continuous probability functions are defined for an infinite number of points over a continuous interval, the probability at a single point is zero, and probabilities are measured over intervals, not single points. That is, the area under a curve (that the function represents) between two distinct points defines the probability for the interval between the two distinct points. The property that the integral must equal one is equivalent to the property for discrete distributions that the sum of all the probabilities must equal one.

The model 152 receives control parameters, in response to which the probability distribution (i.e., the probabilities, p(x), of various values, outcomes, or events) are adjusted while the simulation is in progress, such that the simulator's behavior, output, or simulation state amplifies or creates positive or negative feedback for the user. Positive feedback is a positive or beneficial outcome or resultant simulation state that enables, enhances, or hastens the user's progress in achieving the simulation goal or objective and which indicates or tends to cause the user to believe that the user's previous input data was correct and matched the reference data associated with the previous simulation state, at which time the user provided the input data. Negative feedback is a negative, disadvantageous, or undesirable outcome or resultant simulation state that disables, impedes, prevents, or delays the user's progress in achieving the simulation goal or objective and which indicates or tends to cause the user to believe that the user's previous input data was incorrect and did not match the reference data associated with the previous simulation state, at which time the user provided the input data.

For example, the simulation goal may be to train the user to perform specified tasks or skills or to learn specified knowledge, and the simulator 150 tracks the user's progress toward the goal and illustrates the user's progress toward the goal via a simulation state that the simulator 150 presents or displays to the user trainee via the user terminal 121. Examples of positive feedback include displaying a simulation state that shows an airplane landing, taking off, flying straight and level, accomplishing a turn correctly or otherwise illustrating or representing the achievement of a goal or sub goal. Other examples of positive feedback include displaying a simulation state that shows the user winning points or other units of value or progress or illustrating the increasing of the rate of point accumulation. Examples of negative feedback include displaying a simulation state that shows an airplane crashing, stalling, spinning, failing to fly straight and level, failing to accomplish a turn correctly, or otherwise illustrating or representing the failure to achieve a goal or sub goal. Other examples of negative feedback include displaying a simulation state that shows the user losing points or other units of value or progress, or illustrating the slowing of the rate of the accumulation of units of value.

In an embodiment, the model 152 adjusts the probability distribution by adjusting the expected value of the random variables x, which represents the model output of events. In an embodiment, the model 152 adjusts the probability distribution by adjusting the probability of selected values of the random variable x, where the model 152 selects the events to adjust that create positive or negative feedback, as requested by the control parameters.

The expected value (or mathematical expectation or mean) of a random variable or event x is the sum of the probability of each possible outcome of the simulation multiplied by the outcome value (or payoff). Thus, the expected value represents the average amount that one "expects" as the outcome of the random trial when identical odds are repeated many times.

To define expected value in terms of mathematical formulas, if X is a random variable defined on a probability space, then the expected value of X (denoted E(X)) is defined as:

$$E(X) = \int_\Omega X dP$$

where the Lebesgue integral is employed. The probability space $(\Omega, F, P)$ is a measure space with a probability measure, P, that satisfies the aforementioned probability axioms. The sample space, $\Omega$, is a nonempty set whose elements are known as outcomes or states of nature. The second item, F, is an algebra of subsets of $\Omega$. The elements of F are called events, which are sets of outcomes for which one can ask a probability. F contains $\Omega$; also, the complement of any event is an event, and the union of any (finite or infinite) events is an event. The probability measure P is a function from F to the real numbers that assigns to each event a probability between 0 and 1.

If X is a discrete random variable with values $x_1, x_2, \ldots$ and corresponding probabilities $p_1, p_2, \ldots$ which add up to 1, then the expected value, E(X), can be computed as the sum or series:

$$E(X) = \sum_i p_i x_i.$$

The evaluator 156, via the included controller 162, receives user input data and evaluates the user input data with respective to a standard or training reference 160 and sends model control parameters to the models 152, which biases or adjusts the output state or behavior of the model 152 in response to the control parameters, by adjusting the probabilities of event values of the random variable, which adjusts the output expected value of the model 152, such that the simulator's behavior amplifies, adjusts, or creates positive or negative feedback for the user.

In an embodiment where the simulator 150 is implemented as a flight simulator, the models 152 may include, e.g., a wind model, an aircraft model, and a flight performance model. The wind model generates events, such as wind shear events, based on values of random variables that represent such factors as wind speed, altitude, temperature, humidity, and pressure. The wind shear events influence and affect the simulated aircraft performance and flight paths using the probability distribution of probability functions 158. The wind model receives control parameters from the evaluator 156 that the wind model uses to adjust the frequency and severity of the wind shear events.

The evaluator 156 has access to the simulated aircraft's airspeed and altitude and recommended checklists. The evaluator 156 includes minimum recommended airspeeds for reference altitudes, as recommended by the manufacturer and accepted best practices. Operating below the minimum reference airspeeds and altitudes and failing to follow the checklists causes the airplane to be susceptible to wind shear events, which can cause dangerous deviations from safe flight paths. But, wind shear events have a probabilistic or random nature, so the models 152 do not automatically output dangerous wind shear events in response to the airplane speed and altitude dropping below the reference values or in response to the failure of following the recommended checklist. Instead, the models 152 calculate a probability function 158, in order to only sometimes generate wind shear events.

The evaluator 156 adjusts the value of the wind model control parameters, in order to request that the model 152 provide a higher frequency and severity of wind shear events (the output of the model 152) than the model 152 ordinarily would provide, in response to the evaluator 156 detecting that the simulated airplane airspeed and altitude drops below the reference airspeed and altitude or in response to the evaluator 156 detecting that the recommended checklist was not followed. The evaluator 156 adjusts the value of the model control parameters in a smooth and progressive manner, so that a slight increase in wind shear frequency and severity occurs when the airspeed and altitude are slightly below (less than a threshold amount below) the reference airspeed and altitude, and so that a higher increase in wind shear frequency and severity occurs when the airspeed and altitude are significantly below (more than a threshold amount below) the reference airspeed and altitude.

The airplane model generates carburetor icing events that influence and affect the simulated formation of ice in the simulated carburetor using a probability distribution of a probability function 158. The airplane model receive a model control parameter from the evaluator 156 that the airplane model uses to adjust the frequency and severity of carburetor icing events, which have a probabilistic or random nature. Thus, while some atmospheric conditions may make icing more probable, the formation of ice in the carburetor and resulting loss of power are not certain and are not perfectly predictable. The evaluator 156 has access to the simulated aircraft's airspeed, altitude, and angle of attack. The evaluator 156 includes the training references 160, which in the example of the airplane simulator include a reference checklist for the airspeed, and altitude under which the user is to input an activation of carburetor heat.

The evaluator 156 adjusts the value of the airplane model control parameters, in order to request that the airplane model adjust its event output to provide a higher frequency and severity of carburetor icing (the event output of the airplane model) than the airplane model ordinarily would provide, in response to the evaluator 156 detecting that the user has not input the activation of carburetor heat, i.e., in response to the evaluator 156 detecting a difference between the user input data and the reference data of the training references.

Thus, in an embodiment, in response to the user providing input data that matches (or is less than a threshold amount away from) the reference data, the probability distribution of the event output is positively adjusted, in order to increase the probability of positive feedback (or reward) and decrease the probability of negative feedback (or penalty) to the user. Similarly, in response to the user providing input data that does not match (or is more than a threshold amount away from) the reference data, the event output is negatively adjusted, in order to decrease the probability of positive feedback (or reward) and increase the probability of negative feedback (or penalty) to the user. In an embodiment, the amount of the adjustment is in proportion to the degree of correctness or incorrectness of the input data in relation to the reference data, so that greater correctness causes a higher probability of positive feedback and lower correctness causes a lower probability of positive feedback. In various embodiments, the positive and negative feedback, rewards, or penalties make take a variety of forms, such as increase or decrease in units of value, increase or decrease in monetary units, increase or decrease in points, continuation of the simulation, termination of the simulation, or any other appropriate feedback given to the user.

Although the simulator 150 and the evaluator 156 have been described in the context of a flight simulator, in other embodiments, they may implement any appropriate simulation and evaluation, such as a medical diagnostic simulator, a game simulator, or any other appropriate training simulator. The simulator 150 and the evaluator 156 are further described below with reference to FIG. 2. The models 152 and the evaluator 156 are further described below with reference to FIG. 3.

In an embodiment, the logic 154 of the simulator 150, the model 152, and/or the controller 162 of the evaluator 156 include instructions capable of executing on the processor 101 or statements capable of being interpreted by instructions that execute on the processor 101, to carry out the functions as further described below with reference to FIGS. 7 and 8. In another embodiment, some or all of the model 152, the logic 154, and/or the controller 162 are implemented in hardware via logical gates and other hardware devices in lieu of, or in addition to, a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, which may include user output devices (such as a video display device, speaker, and/or television set) and user input devices (such as a keyboard, mouse, keypad, touchpad, trackball, buttons, light pen, or other pointing device).

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types, such as printers or fax machines. The network adapter 114 provides one or more communications paths from the computer system 100 to other digital devices and computer systems 132; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the server computer system 132. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3 specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The server computer system 132 may include some or all of the hardware components previously described above as being included in the computer system 100.

It should be understood that FIG. 1 is intended to depict the representative major components of the computer system 100, the network 130, and the server computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., and are referred to hereinafter as "computer programs," or simply "programs." The computer programs typically comprise one or more instructions that are resident at various times in various memory and storage devices in the computer system 100, and that, when read and executed by one or more processors in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor or processors, such as the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102, CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
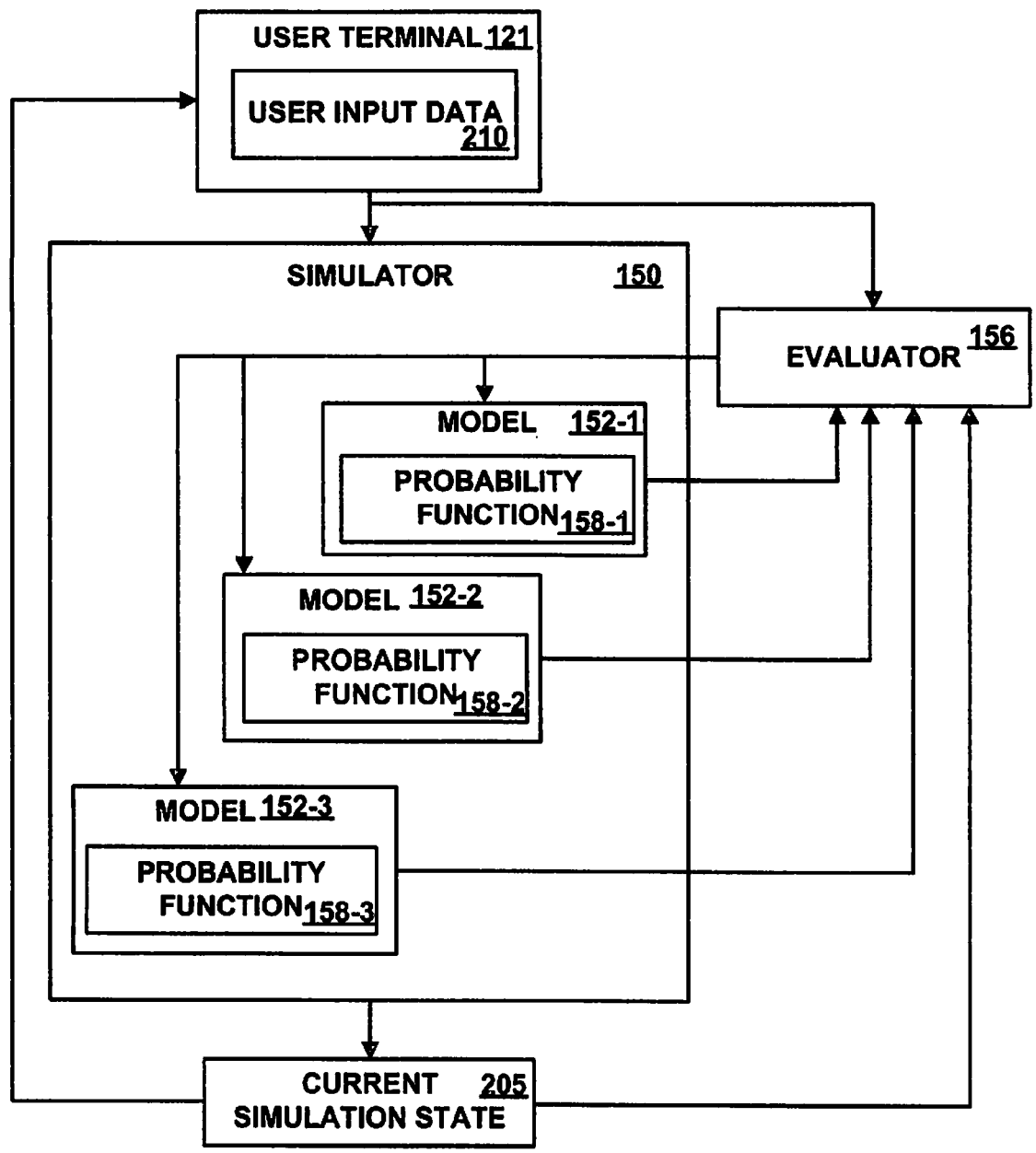
FIG. 2 depicts a block diagram of selected components of the example system, according to an embodiment of the invention.

FIG. 2 depicts a block diagram of selected components of the example system, according to an embodiment of the invention. The example system illustrated in FIG. 2 includes the user terminal 121, the simulator 150, the evaluator 156, and the current simulation state 205. The simulation state 205 is stored in the memory 102 or other storage device. The simulator 150 includes the example models 152-1, 152-2, and 152-3, each of which includes respective probability functions 158-1, 158-2, and 158-3, each of which is an example of the probability function 158 (FIG. 1).

A user sends user input data 210 to the simulator 150 and the evaluator 156 via a user interface of the user terminal 121. The evaluator 156 receives the user input data 210 from the user terminal 121 and also receives a current simulation state 205 from the simulator 150 and sends model control parameters to the models 152-1, 152-2, and 152-3 of the simulator 150. The simulator 150 sends the current simulation state 205 to the user terminal 121, where it is displayed, e.g. via a video display, or presented, e.g., via audio from speakers, printed on a printer, or output through a touch output device.

In an embodiment where the simulator 150 is a flight simulator, the user input data 210 may be a throttle position, an aileron position, a rudder position, a carburetor heat position, or any other appropriate user input. The current simulation state 205 may be a current angle of attack, airspeed, bank position relative to the horizon, and altitude of the simulated airplane, or any other appropriate state, which may be graphically displayed or presented via the user terminal 121.

The current simulation state 205 includes an aggregation of simulation data that characterizes or represents the user and the simulation at a point in time. A simulation starts at an initial simulation state at an initial point in time and progresses through a series of next simulation states at corresponding next points in time, ending at a final simulation state at a corresponding final point in time. At a point in time, e.g., at a time corresponding to an original simulation state, the simulator 150 receives the input data 210 and, in response, calculates and presents a next simulation state at a corresponding next point in time. Then, the process repeats. The time of the original simulation state is previous to the time of the next simulation state. The simulator 150 displays or presents some or all of the simulation data at a current point in time as the current simulation state 205 via the user terminal 121.

In the example of an airplane flight simulator, the simulation data may include the type of airplane whose flight is being simulated, the air speed, altitude, position, direction of movement, and angle of attack of the simulated airplane, the wind speed, atmospheric pressure, humidity, temperature, and other atmospheric conditions surrounding the simulated airplane. In the example of a card game simulator, the simulation data may include the cards dealt to each player (the user and any simulated players) and dealt as community cards, the points, chips, tricks, or other units of value that each player has, bids, or wins. The simulation data presented or displayed via the current simulation state 205 provides feedback, positive or negative, to the user in response to the user input data 210.

The models 152-1, 152-2, and 152-3 receive the user input data 210 from the user terminal 121, receive the model control parameters from the evaluator 156, and send the current simulation state 205 to the user terminal 121, where it is displayed or presented to the user.

Figure 3:
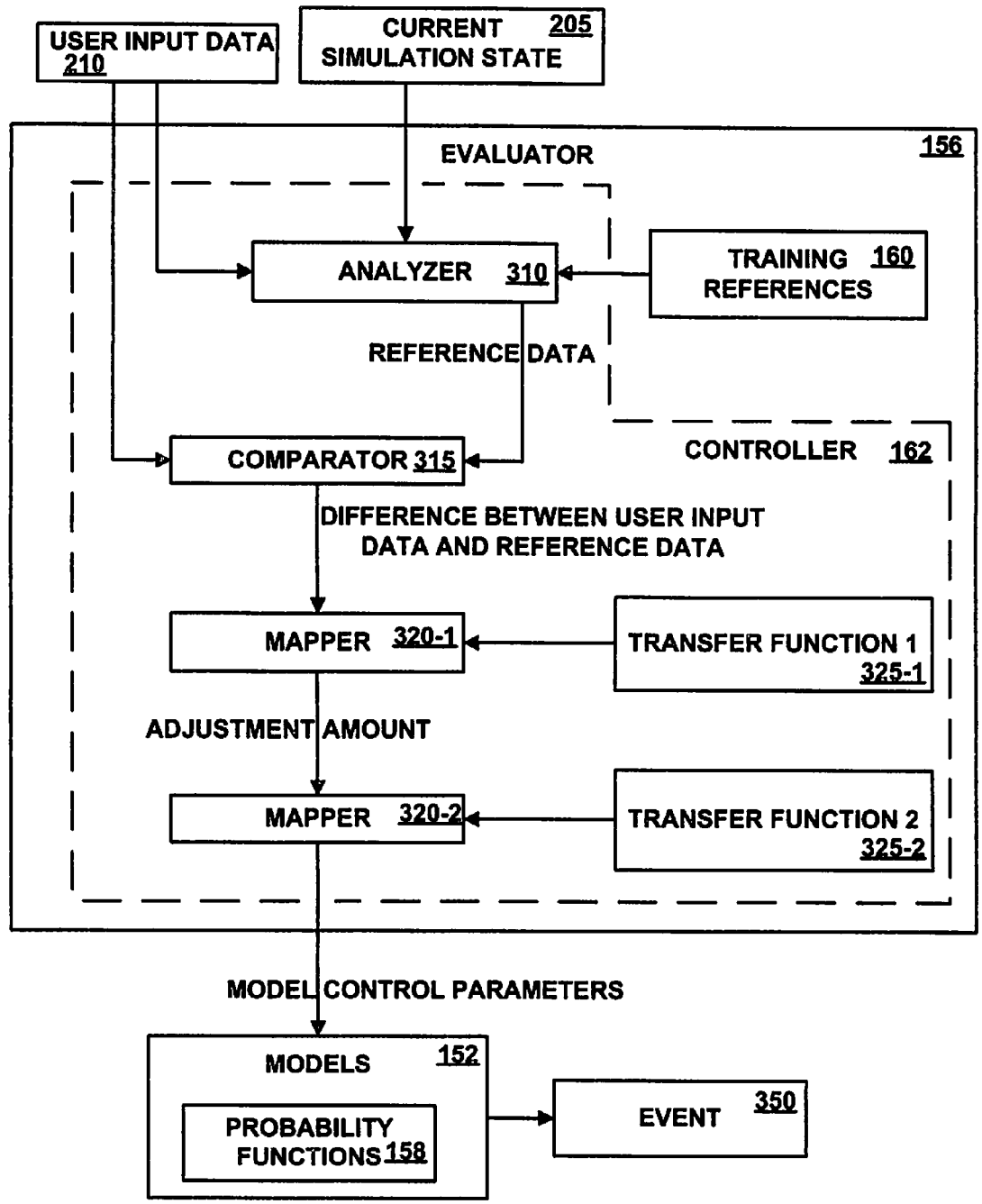
FIG. 3 depicts a block diagram of further selected components of the example system, according to an embodiment of the invention.

FIG. 3 depicts a block diagram of further selected components of the example system, according to an embodiment of the invention. The evaluator 156 includes the training references 160 and the controller 162. The controller 162 includes an analyzer 310, a comparator 315, a mapper 320-1, a mapper 320-2, a first transfer function 325-1, and a second transfer function 325-2, each of which may be implemented by hardware elements such as logic gates and/or by instructions capable of executing on the processor 101 or by statements capable of being interpreted by instructions that execute on the processor 101. In another embodiment, the training references 160 are optional or not used. In another embodiment, the first transfer function 325-1 and the second transfer function 325-2 may be provided by a single transfer function. In another embodiment, the analyzer 310, the comparator 315, the mapper 320-1, the mapper 320-2, the first transfer function 325-1, and the second transfer function 325-2 may be organized as any number of entities within the controller 162.

The logic 154 of the simulator 150 (FIG. 1) reads or receives the user input data 210 from a user interface of the user terminal 121 (FIG. 1) and provides the user input data 210 and the current simulation state 205 to the analyzer 310 of the evaluator 156.

The analyzer 310 receives the current simulation state 205, the user input data 210, and the training references 160. The training references 160 include the optimum input, correct input, best practices, best strategies, or expected input for a variety of simulation states. In the example of the flight simulator, the training references 160 may include a preflight checklist, a landing checklist, a short take off and landing checklist, an emergency procedures checklist, minimum recommended airspeeds for a variety of altitudes and angles of attack, a never exceed airspeed, a stall speed, carburetor heat settings, flap settings, throttle settings, or any other appropriate reference material, as recommended by the manufacturer and as accepted best flight practices or strategies. In an embodiment, the analyzer 310 calculates the reference data 160 based on the current simulation state 205, and the user input data 210. In another embodiment, the analyzer finds the reference data in the training references 160 that is associated with or corresponds to the current simulation state 205.

The comparator 315 receives the calculated reference data from the analyzer 310 and receives the user input data 210. The comparator 315 calculates the magnitude or amount of the difference (the degree of correctness) between the user input data 210 and the reference data. For example, if the calculated reference data is a carburetor heat setting of "100 units of carburetor heat" (or full on), but the received user input data 210 is a carburetor heat setting of "25 units of carburetor heat" (or partially on), then the difference between the calculated reference data and the received user input data 210 is 100−25=75 units of carburetor heat.

The mapper 320-1 receives the calculated difference between the user input data 210 and the reference data from the comparator 315 and receives output from the first transfer function 325-1. The mapper 320-1 determines the amount of adjustment or reinforcement (either positive or negative) for a model output event 350, if any, based on the calculated difference and the output of the first transfer function 325-1. In an embodiment, the determined amount of adjustment is proportional to the amount of the calculated difference.

The model output event 350 is associated with the difference between the user input data 210 and the reference data. In an embodiment, the difference between the user input data 210 and the reference data increases (or changes) the probability of the existence of, or the intensity or severity of, the model output event 350; that is, the difference and the model output event 350 have a relationship that is at least partially causal. For example, failure to fully engage carburetor heat increases the likelihood (the probability) of an occurrence of carburetor icing and failure to maintain minimum airspeed increases the likelihood (the probability) of an occurrence of a wind shear event.

But, in another embodiment, the difference between the user input data 210 and the reference data does not increase, does not decrease, or does not change the probability of the existence of, or the intensity or severity of, the model output event 350; that is, the difference and the model output event 350 do not have a causal relationship and are independent. Instead, the relationship or association between the difference and the model output event 350 is that the difference (or lack of a difference) has a positive or negative impact on the current simulation state 205 (the feedback) that the model output event 350 causes the user to experience. Consider an example where the simulator 150 is a home construction simulator, the reference data is the act of placing a tarp over a hole in the roof, the user input data 210 is failing to place a tarp over the hole, and the model output event 350 is a rain storm. Failing to place a tarp over the hole does not increase the probability of rain (in an unadjusted simulation that accurately reflects the real world), so the difference (between the user input data 210 and the reference data) and the event 350 do not have a causal relationship. But, if rain occurs, that rain has a negative impact on the exposed interior of the house, so the difference between the user input data 210 (failing to place a tarp) and the reference data (placing the tarp) has a negative impact on the current simulation state 205 (the building materials are ruined, causing increased project cost and lower profit).

The mapper 320-2 receives the amount of adjustment reinforcement, if any, from the mapper 320-1 and receives the output of a second transfer function 325-2. The mapper 320-2 calculates the value of the model control parameter based on the amount of the received reinforcement, if any, and the output of the second transfer function 325-2. The mapper 320-2 sends the value of the model control parameter to the logic 154 of the simulator 150.

The logic 154 of the simulator 150 receives the model control parameter from the mapper 320-2 and sends the value of the model control parameter, the user input data 210, and the current simulation state 205 to the model 152.

The model 152 receives the model control parameter, the user input data 210, and the current simulation state 205 and processes a probability function 158, which creates model output events 350. The model 152 adjusts the probability of the model output events 350, in response to the model control parameter. That is, the model 152 adjusts the relationship of an expected value of an event 350 and the probability of that expected value, by the adjusted amount or in proportion to the adjusted amount.

Thus, in an embodiment, the model 152 creates a causal relationship between the event 350 and the difference (between the user input data 210 and the reference data) where a causal relationship did not exist before. Hence, the difference between the input data and the reference data causes a change from the probability of the event value to an adjusted probability of an adjusted event value. For example, the model 152 increases the probability that rain will occur in response to the failure of a tarp to be placed over a hole in a roof.

In another embodiment, the model 152 intensifies the causal relationship (intensified in either in probability or severity) that already exists between the difference (the difference between the user input data 210 and the reference data) and the model output event 350, in response to the model control parameter. For example, the model 152 increases the probability that carburetor icing occurs (the event 350), in response to the failure to apply carburetor heat.

Figure 4A:
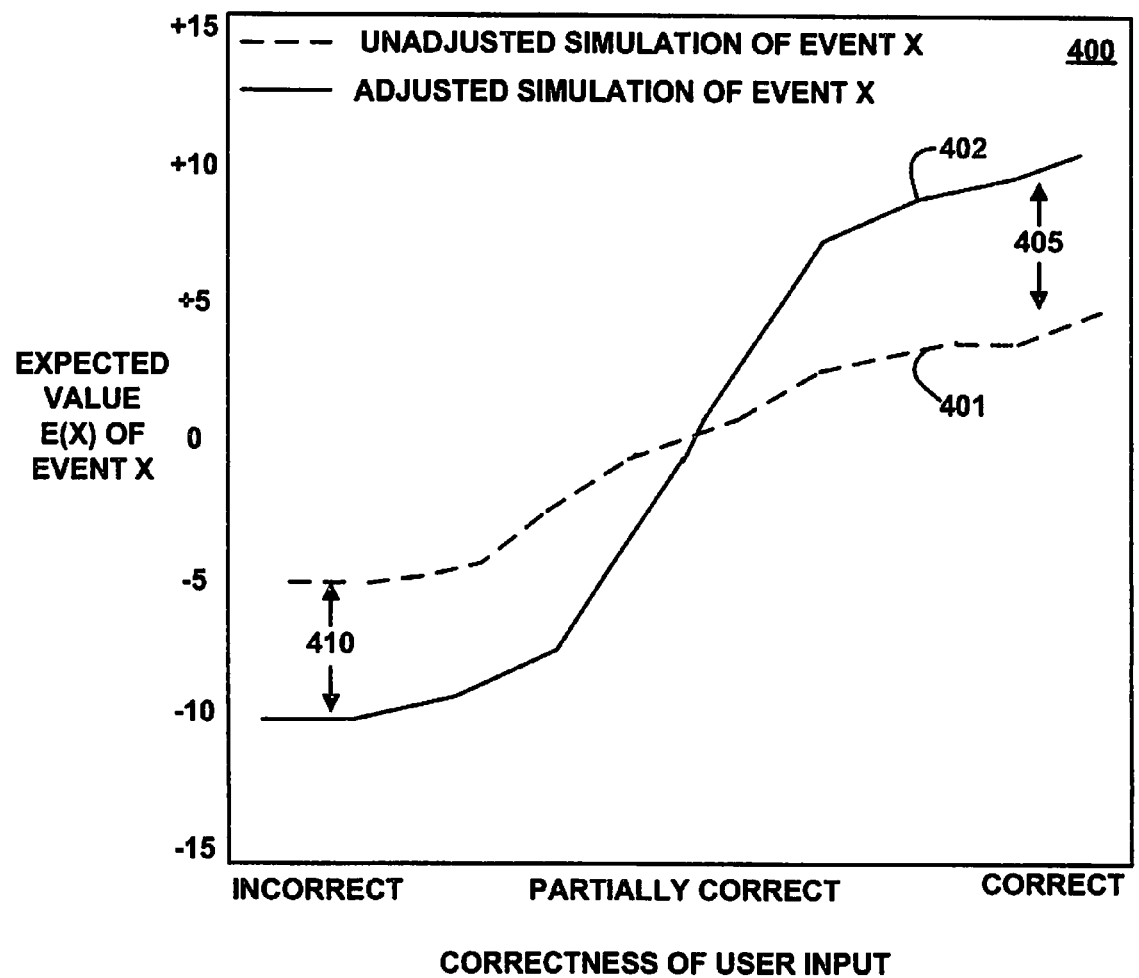
FIG. 4A depicts a block diagram of an example graph of unadjusted and adjusted expected value probability distributions, according to an embodiment of the invention.

FIG. 4A depicts a block diagram of an example graph 400 of unadjusted and adjusted expected value probability distributions, according to an embodiment of the invention. The graph 400 is illustrated using a Cartesian coordinate system with the expected value E(X) of a model output event x on the y-axis of the graph 400 and the corresponding degree of correctness of the user input (the amount of the difference between the user input data 210 and the reference data, as produced by the comparator 315 and as previously described above with reference to FIG. 3) on the x-axis of the graph 400. The curve 401 (drawn with dashed lines) illustrates an accurate, realistic, neutral, or unadjusted probability distribution of the expected value E(x) of the event x in an embodiment where the evaluator 156 sends a neutral model control parameter to the model 152. The curve 402 (drawn with a solid line) illustrates an adjusted probability distribution of the expected value E(x) of the event x in embodiments where the evaluator 156 sends a positive or negative control parameter (an amount of adjustment and direction) to the model 152.

The positive adjustment amount 405 is the difference between the two curves 401 and 402, where the curve 402 is above (the adjusted expected value using the adjusted probability distribution is greater than the unadjusted expected value using the unadjusted probability distribution at the same degree of correctness) the curve 401, and represents the change in the model output of the event x in the positive direction, in response to the model 152 receiving a positive control parameter and a positive adjustment amount. The negative adjustment amount 410 is the difference between the two curves 401 and 402, where the curve 402 is below (the adjusted expected value using the adjusted probability distribution is less than the unadjusted expected value using the unadjusted probability distribution at the same degree of correctness) and represents the change in the model output of the event x in the negative direction, in response to the model 152 receiving a negative control parameter and a negative adjustment amount.

Figure 4B:
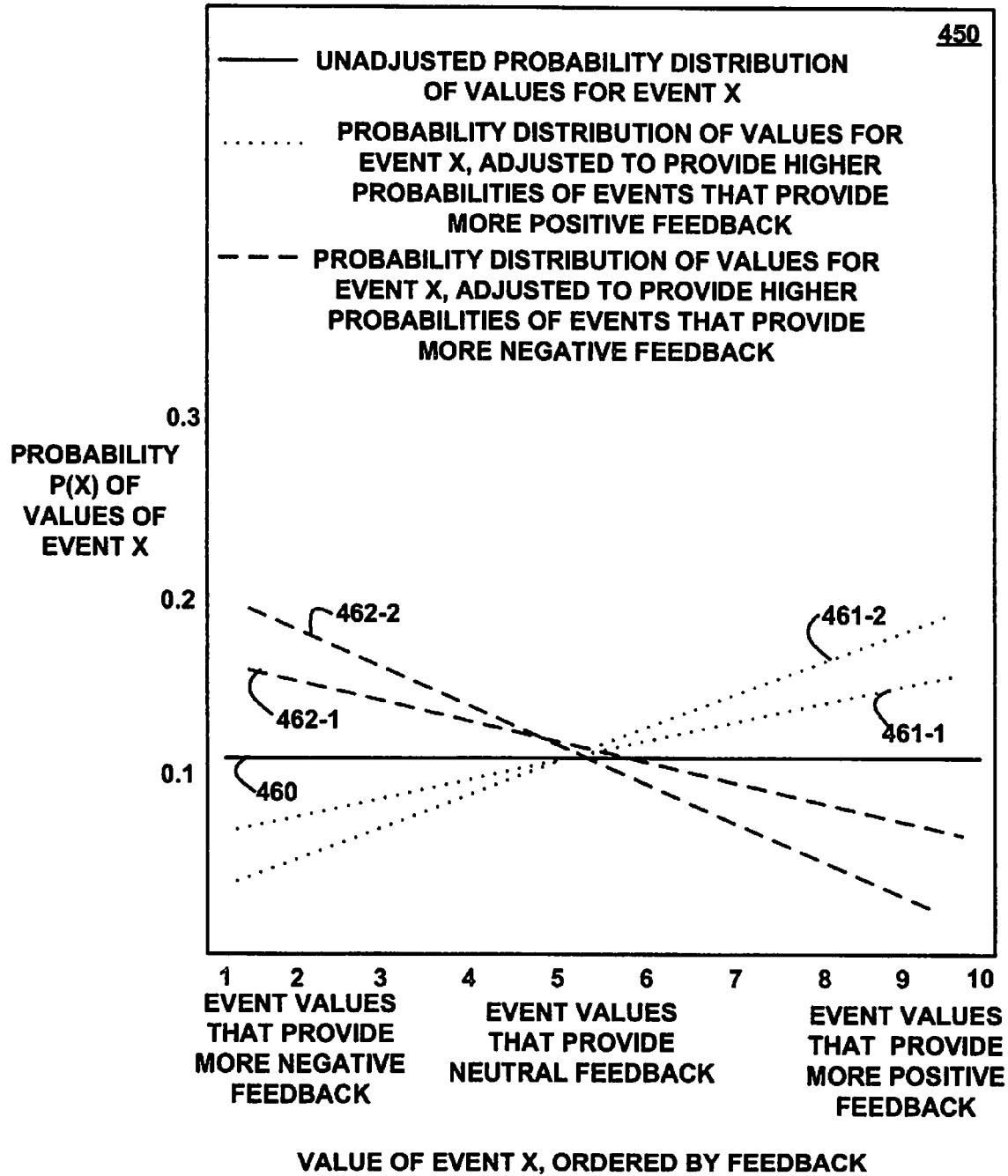
FIG. 4B depicts a block diagram of an example graph of unadjusted and adjusted probability distributions, according to an embodiment of the invention.

FIG. 4B depicts a block diagram of an example graph 450 of unadjusted and adjusted probability distributions, according to an embodiment of the invention. The graph 450 is illustrated using a Cartesian coordinate system with the values of a model output event x on the x-axis of the graph 450 and the corresponding probability P(x) of the values of the event x on the y-axis of the graph 450.

In an embodiment, the simulator 150 creates categories for the event values, such as the positive feedback category, the neutral feedback category, and the negative feedback category, to which the event values belong. In FIG. 4B, the event values that belong to the same category are grouped together on the x-axis. In FIG. 4B, the event values are listed on the x-axis such that those event values that provide less positive feedback (more negative feedback) are illustrated to the left of the event values in the neutral category, and those event values that provide more positive feedback (the least negative feedback) are illustrated to the right of the event values in the neutral category, but the event values are not necessarily in any order within each category.

In another embodiment, the simulator 150 assigns a ranking value to each of the possible event values that indicates the amount of positive or negative feedback that each event value provides relative to every other event value. The aggregation of these ranking values provides an order of the event values from least positive feedback (most negative feedback) through neutral feedback (neither positive nor negative feedback) and on to the most positive feedback (the least negative feedback). The event values are displayed on the x-axis of the graph 450 in this ranking order.

The graph 450 includes curves 460, 461-1, 461-2, 462-1, and 462-2, which represent various alternative probability distributions of combinations of event values and probabilities. Although the curves 460, 461-1, 461-2, 462-1, and 462-2 are illustrated in FIG. 4B as straight lines, in other embodiments they may have any shape representing any function or distribution, may be discrete or continuous, and any number and type of curves may be used.

The curve 460 (drawn with a solid line) illustrates an accurate, realistic, neutral, or unadjusted probability distribution of the event x in an embodiment where the evaluator 156 sends a neutral model control parameter to the model 152. If the simulator 150 uses the probability distribution represented by the curve 460, then the simulator 150 does not adjust the feedback that the user receives based on the relative correctness or incorrectness of the user input data as compared to the reference data.

The curves 461-1 and 461-2 (drawn with dotted lines) illustrate adjusted probability distributions of the event x in embodiments where the evaluator 156 sends a positive control parameter (an amount of adjustment and direction) to the model 152, in order to provide higher probabilities of the occurrence of event values that result in more positive feedback to the user. The curves 461-1 and 461-2 have positive slopes, that is, the probabilities rise from the event values that are ranked as providing more negative feedback toward the event values that are ranked as providing more positive feedback.

The curves 462-1 and 462-2 (drawn with dashed lines) illustrate adjusted probability distributions of the event x in embodiments where the evaluator 156 sends a negative control parameter (an amount of adjustment and direction) to the model 152, in order to provide higher probabilities of the occurrence of event values that result in more negative feedback to the user. The curves 462-1 and 462-2 have negative slopes, that is, the probabilities fall from the event values that are ranked as providing more negative feedback toward the event values that are ranked as providing more positive feedback.

The curve 461-2 has the highest slope, followed by the curve 461-1, followed by the curve 460, followed by the curve 462-1, and followed by the curve 462-2. Thus, the probability distribution represented by the curve 461-2 provides the greatest probability of positive feedback while the probability distribution represented by the curve 462-2 provides the lowest probability of positive feedback (the highest probability of negative feedback).

In an embodiment, the simulator 150 adjusts or selects the probability distribution that the simulator 150 uses to generate an event value by adjusting the slope of the curve that represents the probability distribution (i.e., by adjusting the probability function that generates the event values, so that the probability function generates values that are characterized by a different slope), and the simulator 150 adjusts the slope by an adjustment amount that is in proportion to the degree of correctness of the user input (the difference between the user input and the reference data). Thus, for example, if the user input is highly correct, then the simulator 150 uses the probability distribution represented by the curve 461-2; if the user input is moderately correct, then the simulator 150 uses the probability distribution represented by the curve 461-1; if the user input is moderately incorrect, then the simulator 150 uses the probability distribution represented by the curve 462-1; and if the user input is highly incorrect, then the simulator 150 uses the probability distribution represented by the curve 462-2.

In another embodiment, the simulator 150 adjusts or selects the probability distribution that the simulator 150 uses to generate an event value by adjusting the size of the area underneath the curve that corresponds to the type of feedback that the simulator 150 has selected to present to the user. In an embodiment, the simulator 150 adjusts the size of the area in proportion to the degree of correctness of the user input (the difference between the user input and the reference data). The simulator 150 may determine the size of the area under the curve, e.g., by calculating an integral of the probability function (or by summing the probabilities) over the range of event values that are associated with, or assigned to, the desired type of feedback, e.g., positive feedback, neutral feedback, or negative feedback. The size of the area represents the probability of providing the corresponding feedback. For example, if the event values of "8," "9," and "10" are assigned to positive feedback, then the curve 461-2 has the largest area underneath it over the range of "8," "9," and "10," and the curve 462-2 has the smallest area underneath it over the range of "8," "9,", and "10."

Figures 5, 6:
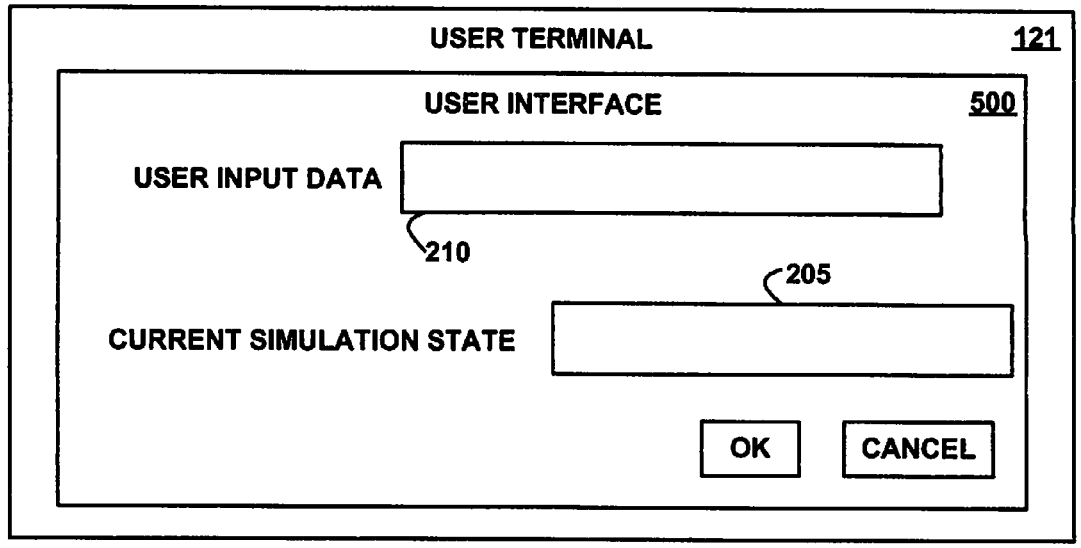
FIG. 5 depicts a block diagram of an example user interface presented via a terminal, according to an embodiment of the invention.
FIG. 6 depicts a block diagram of example training references, according to an embodiment of the invention.

FIG. 5 depicts a block diagram of an example user interface 500, according to an embodiment of the invention. The example user interface 500 is displayed or presented (e.g., via speakers) via the user terminal 121. The example user interface 500 includes, displays, or presents the current simulation state 205 and the user input data 210. The user input data 210 may be entered via an input device of the user terminal 121, such as a keyboard, mouse or other pointing device, pedals, dials, buttons, switches, a touch screen, a motion detector or any other input device.

The current simulation state 205 includes an aggregation of simulation data that characterizes or represents the user and the simulation at a point in time. A simulation starts at an initial simulation state at an initial point in time and progresses through a series of simulation states at corresponding points in time, ending at a final simulation state at a corresponding final point in time. In the example of an airplane flight simulator, the simulation data may include the type of airplane whose flight is being simulated, the air speed, altitude, position, bank angle relative to the horizon, direction of movement, and angle of attack of the simulated airplane, the wind speed, atmospheric pressure, humidity, temperature, and other atmospheric conditions surrounding the simulated airplane. In the example of a card game simulator, the simulation data may include the cards dealt to each player (the user and any simulated players) and dealt as community cards, and the points, chips, hands, tricks, or other units of value that each player has, bids, or wins.

FIG. 6 depicts a block diagram of example training references 160, according to an embodiment of the invention. The example training references 160 include entries or records 605, 610, and 615, each of which includes a reference simulation state field 620 and a reference data field 625. The reference simulation state field 620 includes an aggregation of simulation data that characterizes or represents the user and the simulation at a point in time. The reference data field 625 specifies the optimum, desired, recommended, or correct user input that the user should enter, or is expected to enter, when the current simulation state 205 matches, or is identical to, the corresponding reference simulation state 620. In another embodiment, the evaluator 156 calculates the reference data 625 from the current simulation state 205 in lieu of a data structure of associated fields and records. In various embodiments, the training references 160 may be calculated by the logic 154, by the models 152, or by the controller 162, may be received from the user via the user terminal 121, may be received from or stored by the designer of the simulator, or may be received from the network 130, e.g., from the server computer 132.

Figure 7:
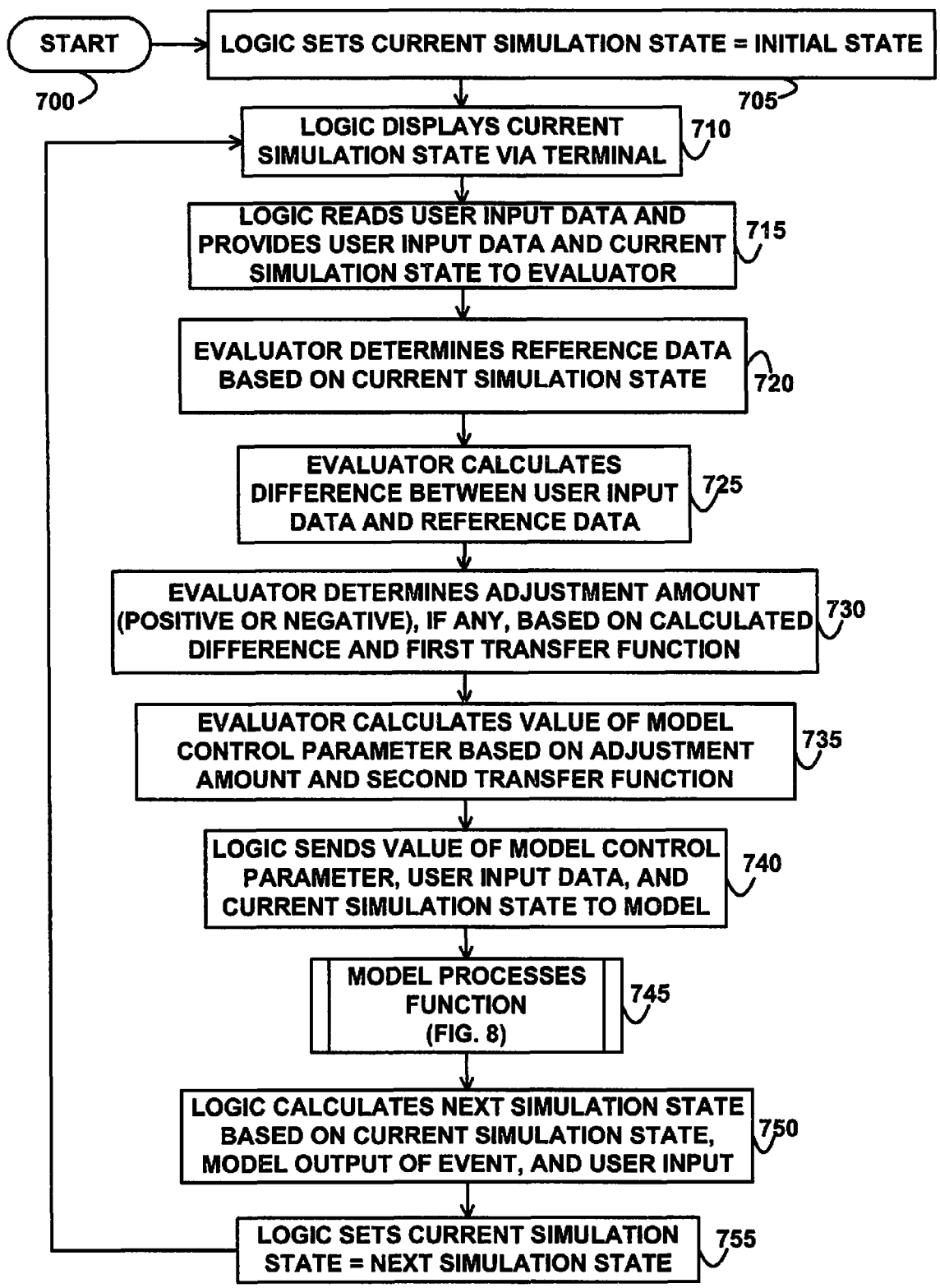
FIG. 7 depicts a flowchart of example processing for logic and an evaluator, according to an embodiment of the invention.

FIG. 7 depicts a flowchart of example processing for logic of a simulator and for a controller of an evaluator, according to an embodiment of the invention. Control begins at block 700. Control then continues to block 705 where the logic 154 of the simulator 150 sets the current simulation state 205 to be an initial simulation state. Control then continues to block 710 where the logic 154 of the simulator 150 displays or presents the current simulation state 205 via the user interface 500 via the user terminal 121. Control then continues to block 715 where the logic 154 of the simulator 150 reads or receives the user input data 210 from the user interface 500 and provides the user input data 210 and the current simulation state 205 to the evaluator 156.

Control then continues to block 720 where the evaluator 156 (the analyzer 310) determines or calculates the reference data 625 for the current simulation state 205. In an embodiment, the evaluator 156 finds a record or entry in the training references 160 with a value in the reference simulation state 620 that matches or is identical to the current simulation state 205. The evaluator 156 then reads the corresponding reference data 625 from the found record or entry with the reference simulation state 620 that matches the current simulation state 205.

Control then continues to block 725 where the evaluator 156 (the comparator 315) calculates the difference between the user input data 210 and the reference data 625. The difference may include an amount or magnitude of the difference and a direction of the difference, e.g., either positive or negative.

Control then continues to block 730 where the evaluator 156 (the mapper 320-1) determines the amount of adjustment or reinforcement (either positive or negative), if any, based on the calculated difference and the first transfer function 325-1. In an embodiment, the mapper 320-1 determines an amount of adjustment, if any, in proportion to the calculated difference. Control then continues to block 735 where the evaluator 156 (the mapper 320-2) calculates the value of the model control parameter based on the amount of reinforcement and the second transfer function 325-2. In embodiment, the model control parameter includes a direction (neutral, positive, or negative) and an amount, which represents the adjustment amount. Control then continues to block 740 where the logic 154 of the simulator 150 sends the value of the model control parameter, the user input data 210, and the current simulation state 205 to the model 152.

Control then continues to block 745 where the model 152 receives the model control parameter, the user input data 210, and the current simulation state 205 and processes a probability function 158, creating a model output event 350, as further described below with reference to FIG. 8.

Control then continues to block 750 where the logic 154 of the simulator 150 calculates the next simulation state based on the current simulation state 205, the model output event 350 (adjusted or unadjusted), and the user input data 210. Control then continues to block 755 where the logic 154 of the simulator 150 sets the current simulation state 205 to be the next simulation state. Control then returns to block 710 where the logic 154 displays or presents the new current simulation state 205 via the user terminal 121, as previously described above.

Figure 8:
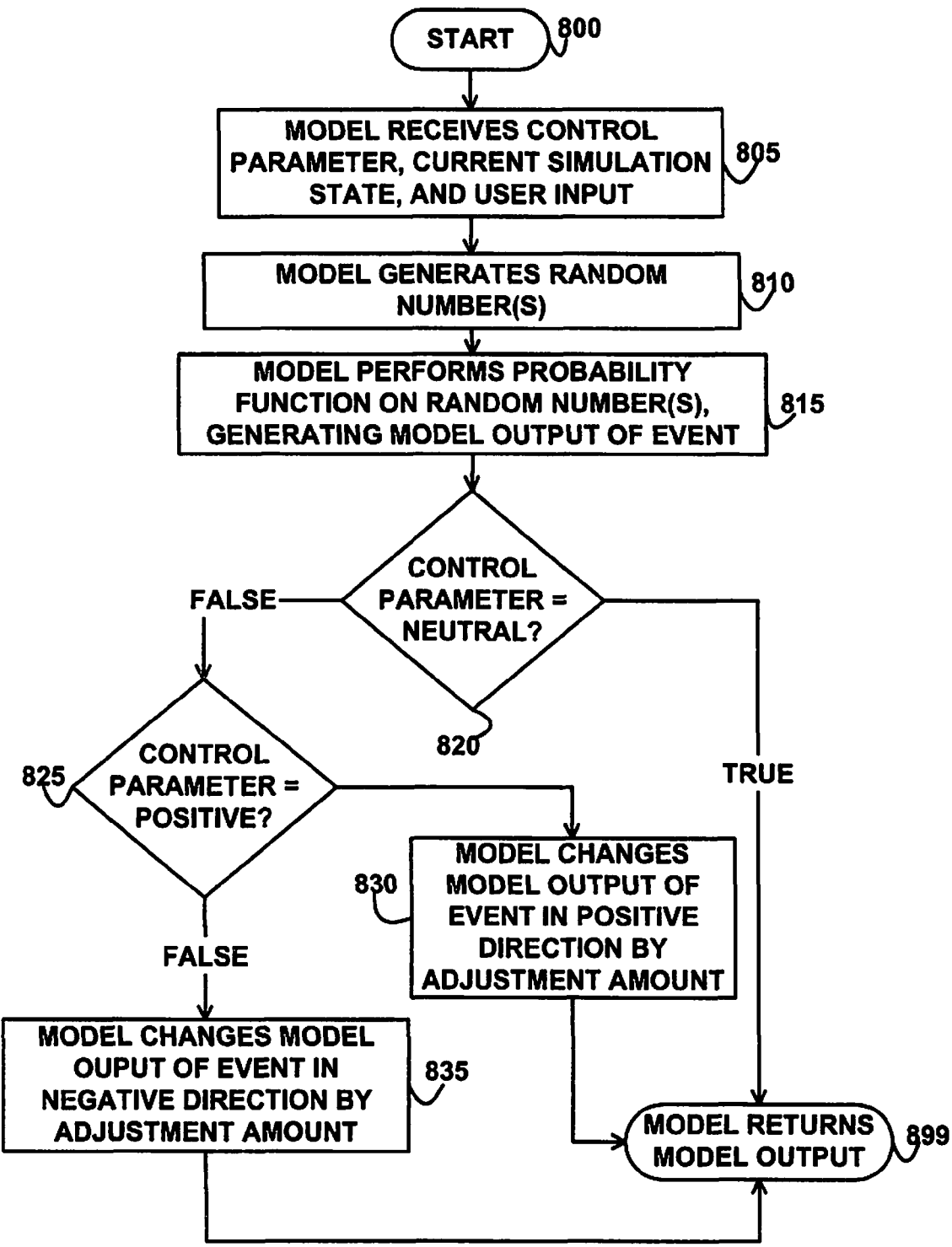
FIG. 8 depicts a flowchart of example processing for a model, according to an embodiment of the invention.

FIG. 8 depicts a flowchart of example processing for a model, according to an embodiment of the invention. Control begins at block 800. Control then continues to block 805 where the model 152 receives the model control parameter, the current simulation state 205, and the user input data 210 from the logic 154 of the simulator 150. Control then continues to block 810 where the model 152 generates random numbers or pseudo-random numbers. Control then continues to block 815 where the model 152 performs the probability function 158 on the random or pseudo-random numbers, generating a model output event 350 that has a value and an associated probability of occurrence. The combination of the value of the generated model output event 350 and the probability of the occurrence of the value is represented as a point on the curve 401 or 460. Control then continues to block 820 where the model 152 determines whether the control parameter specifies neutral reinforcement.

If the determination at block 820 is true, then the control parameter specifies neutral reinforcement, so control continues to block 899 where the model 152 returns the model output event 350 to the logic 154 without reinforcing, adjusting, or changing the generated model output event value (either positively or negatively). Thus, the model 152 returns an unadjusted and un-reinforced model output event value 350 to the logic 154.

If the determination at block 820 is false, then the control parameter does not specify neutral reinforcement, so control continues to block 825 where the model 152 determines whether the model control parameter specifies positive reinforcement or adjustment.

If the determination at block 825 is true, then the model control parameter does specify an adjustment or reinforcement in the positive direction, so control continues to block 830 where the model 152 changes, adjusts or reinforces the previously generated model output event in the positive direction by an adjustment amount specified by the control parameter. For example, the model 152 adjusts the model output event value 350 from a value on the curve 401 to a value on the curve 402 by the adjustment amount 405, creating an adjusted model output event value 350. Thus, the generated model output event 350 is represented as a point on the curve 402 with an adjustment amount 405. As another example, the model 152 adjusts the model output event value from a value on the curve 460 to a value on the curve 461-1 or the curve 461-2, and the model 152 selects the appropriate curve by adjusting the slope of the curve (that represents probability function) by the received adjustment amount or by adjusting the size of the area under the curve over the range of event values that are assigned a positive ranking by the received adjustment amount, creating an adjusted model output event value 350. Control then continues to block 899 where the model 152 returns the adjusted or reinforced value of the model output event 350 to the logic 154 of the simulator 150.

If the determination at block 825 is false, then the control parameter specifies an adjustment or reinforcement in a negative direction, so control continues to block 835 where the model 152 changes, adjusts or reinforces the previously generated model output in the negative direction by the adjustment amount 410 specified by the received model control parameter. For example, the model 152 adjusts the event value from a value on the curve 401 to a value on the curve 402 by the adjustment amount 410. Control then continues to block 899 where the model 152 returns the value of the adjusted or reinforced model output event to the logic 154 of the simulator 150. Thus, the generated model output event 350 is represented as a point on the curve 402 with an adjustment amount 410. As another example, the model 152 adjusts the model output event value from a value on the curve 460 to a value on the curve 462-1 or the curve 462-2, and the model 152 selects the appropriate curve by adjusting the slope of the curve (that represents probability function) by the received adjustment amount or by adjusting the size of the area under the curve over the range of event values that are assigned a negative ranking by the received adjustment amount, creating an adjusted model output event value 350.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   determining reference data that is associated with a reference simulation state that matches a current simulation state, wherein the current simulation state is previous in time to a next simulation state, wherein the reference data specifies an expected user input when the current simulation state is identical to the reference simulation state;
   determining a difference between input data and the reference data, wherein the input data is received from a user via a user input device;
   determining an adjustment amount based on the difference between the input data and the reference data, wherein the adjustment amount is proportional to the difference;
   generating, by a flight simulator, an event value via a probability function, wherein the probability function is stored in a storage device, wherein the probability function measures a probability of the event value over an interval, wherein the probability of a single point is zero;
   adjusting, by the flight simulator, the event value by the adjustment amount into an adjusted event value;
   returning the adjusted event value to logic stored in a storage device;
   determining, by the flight simulator, the next simulation state based on the adjusted event value, wherein the difference between the input data and the reference data causes a change of the probability of the event value to an adjusted probability of the adjusted event value, wherein the logic performs the determining; and
   presenting, by the flight simulator, the next simulation state.

2. The method of claim 1, wherein the adjusting further comprises:
   adjusting the event value in a positive direction in response to the difference that is less than a threshold amount from the reference data, wherein the next simulation state provides positive feedback for the input data.

3. The method of claim 1, wherein the adjusting further comprises:
   adjusting the event value in a negative direction in response to the difference that is more than a threshold amount from the reference data, wherein the next simulation state provides negative feedback for the input data.

4. A method for deploying computing services, comprising:
   integrating computer readable code into a computer system, wherein the code in combination with the computer system performs the method of claim 1.

5. A non-transitory storage medium encoded with instructions, wherein the instructions when executed comprise:
   calculating reference data that is associated with a reference simulation state that matches a current simulation state, wherein the current simulation state is previous in time to a next simulation state, wherein the reference data specifies an expected user input when the current simulation state is identical to the reference simulation state;
   determining a difference between input data and the reference data, wherein the input data is received from a user via a user input device;
   determining an adjustment amount based on the difference, wherein the adjustment amount is proportional to the difference;
   generating, by a flight simulator, an event value via a probability function, wherein the probability function measures a probability over an interval, wherein the probability of a single point is zero;
   adjusting, by the flight simulator, the event value by the adjustment amount into an adjusted event value;
   determining, by the flight simulator, the next simulation state based on the adjusted event value, wherein the difference between the input data and the reference data causes a change of the probability of the event value to an adjusted probability of the adjusted event value; and
   presenting, by the flight simulator, the next simulation state.

6. The non-transitory storage medium of claim 5, wherein the adjusting further comprises:
adjusting the event value in a positive direction in response to the difference that is less than a threshold amount from the reference data, wherein the next simulation state provides positive feedback for the input data.

7. The non-transitory storage medium of claim 5, wherein the adjusting further comprises:
adjusting the event value in a negative direction in response to the difference that is more than a threshold amount from the reference data, wherein the next simulation state provides negative feedback for the input data.

8. A computer system comprising:
a processor; and
memory connected to the processor, wherein the memory encodes instructions that when executed by the processor comprise:
calculating reference data that is associated with a reference simulation state that matches a current simulation state, wherein the current simulation state is previous in time to a next simulation state, wherein the reference data specifies an expected user input when the current simulation state is identical to the reference simulation state,
determining a difference between input data and the reference data, wherein the input data is received from a user via a user input device,
determining an adjustment amount based on the difference, wherein the adjustment amount is proportional to the difference,
generating, by a flight simulator, an event value via a probability function, wherein the probability function measures a probability over an interval, wherein the probability of a single point is zero,
adjusting, by the flight simulator, the event value by the adjustment amount into an adjusted event value,
determining, by the flight simulator, the next simulation state based on the adjusted event value, wherein the difference between the input data and the reference data causes a change of the probability of the event value to an adjusted probability of the adjusted event value, and
presenting, by the flight simulator, the next simulation state.

9. The computer system of claim 8, wherein the adjusting further comprises:
adjusting the event value in a positive direction in response to the difference that is less than a threshold amount from the reference data, wherein the next simulation state provides positive feedback for the input data.

10. The computer system of claim 8, wherein the adjusting further comprises:
adjusting the event value in a negative direction in response to the difference that is more than a threshold amount from the reference data, wherein the next simulation state provides negative feedback for the input data.

* * * * *